June 30, 1936. E. H. BUFORD 2,045,578
VENTILATING SYSTEM FOR MOTOR VEHICLES
Filed July 18, 1934 2 Sheets-Sheet 1
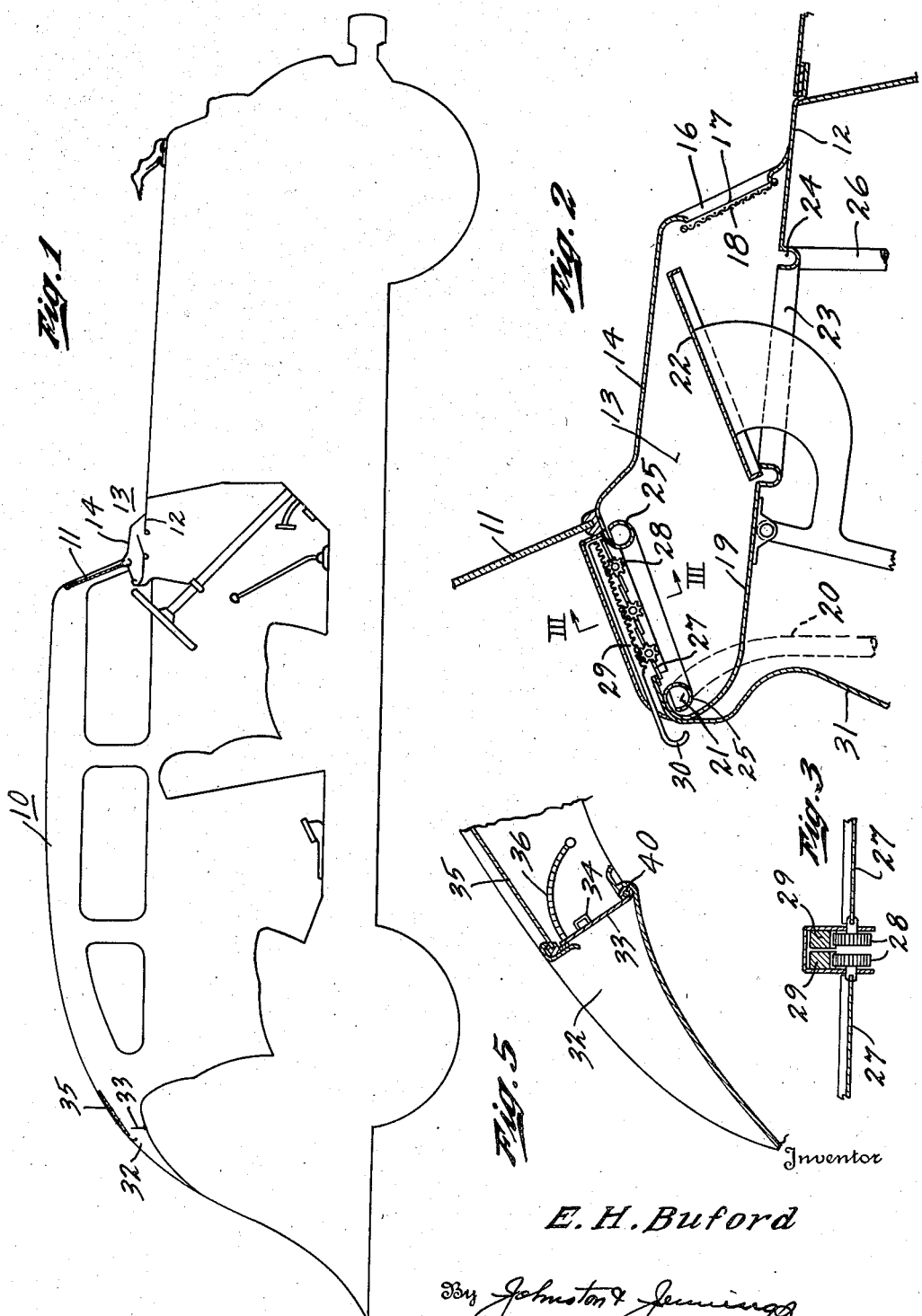
Inventor
E. H. Buford
By Johnston & Jennings
Attorneys June 30, 1936.  E. H. BUFORD  2,045,578
VENTILATING SYSTEM FOR MOTOR VEHICLES
Filed July 18, 1934   2 Sheets-Sheet 2
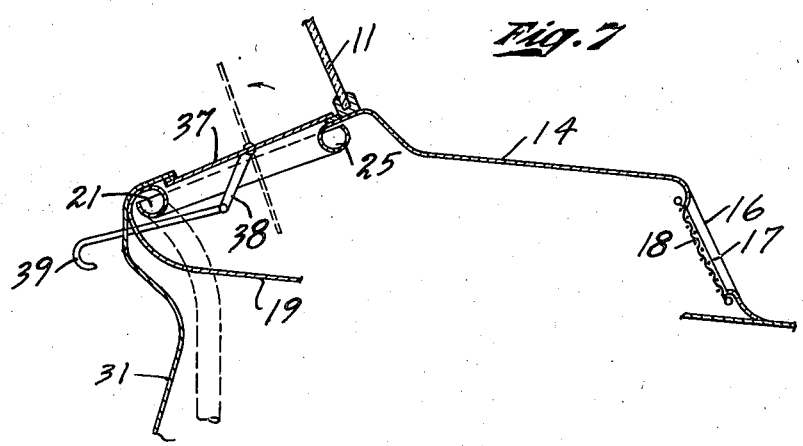
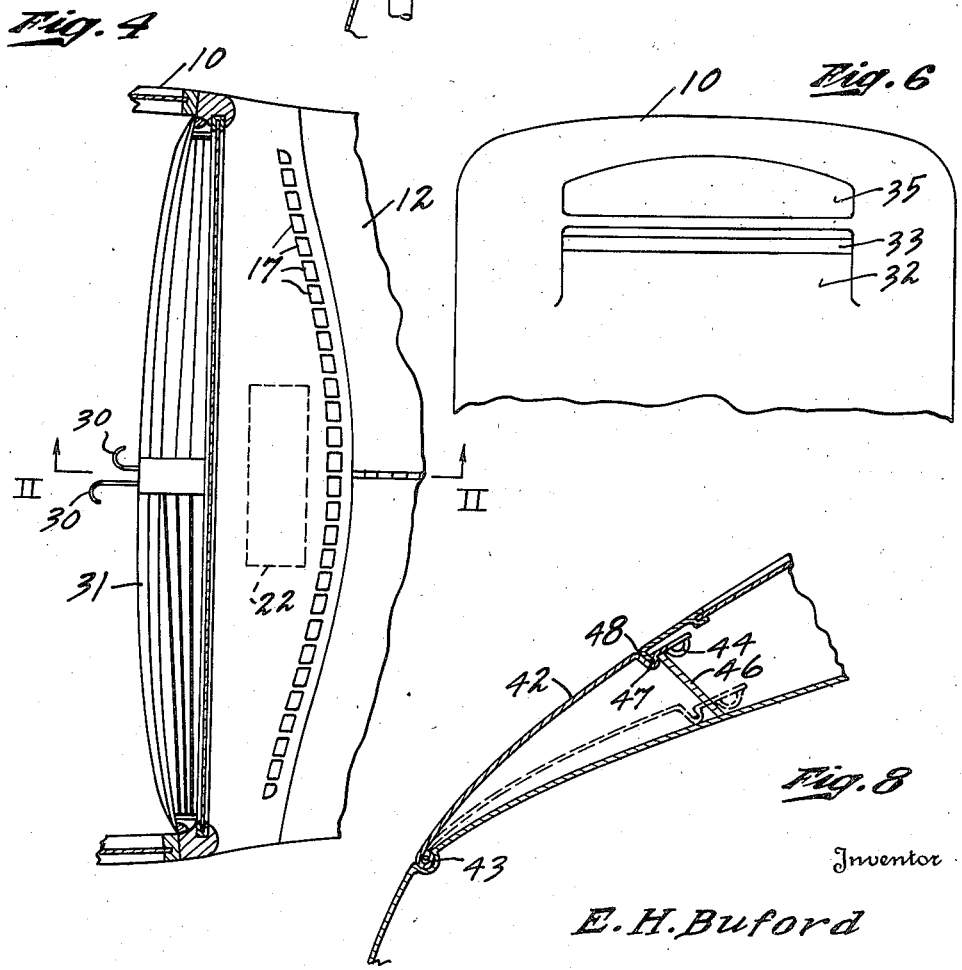
Inventor
E. H. Buford
By Johnston & Jennings
Attorneys Patented June 30, 1936

2,045,578

UNITED STATES PATENT OFFICE 2,045,578

VENTILATING SYSTEM FOR MOTOR VEHICLES

Edwin H. Buford, Anniston, Ala.

Application July 18, 1934, Serial No. 735,845

13 Claims. (Cl. 98—2)

My invention relates to ventilating devices for the front and rear of motor vehicles, which may be used singly or in combination to constitute a ventilating system, and has for an object the provision of apparatus of the character designated which shall be operable to provide a maximum of comfort for passengers in such vehicles in adverse weather conditions.

Another object of my invention is to provide a ventilating system for closed motor vehicles which shall be effective to eliminate drafts caused by eddy currents of air in the rear portion of such vehicles when running with air admission devices open.

A still further object of my invention is to provide a ventilating system for motor vehicles which shall include a means for admission of air through the front of the vehicle, and in which flying insects are excluded and water is separated from the air currents and drained away so that the vehicle may be ventilated in stormy weather.

A still further object of my invention is to provide a ventilating system for motor vehicles which shall be effective to provide a controlled circulation of air from the front through the rear of the vehicle when running, and one which may be used as an adjunct to existing systems of ventilation.

A still further object of my invention is to provide a ventilation system for motor vehicles that will permit a flow of air to impinge against the back of the windshield which will minimize or eliminate condensation and thereby improve visibility.

A still further object of my invention is to provide a ventilation system for motor vehicles which shall include means to vary the direction of flow of air entering the vehicle from horizontal to vertical.

A still further object of my invention is to provide a ventilating system for motor vehicles, that even while open will not permit access by intruders through these devices to the interior of the vehicle.

As is well known in the art to which my invention relates, the forward compartment of a motor vehicle becomes very uncomfortable in warm weather due to the proximity of the engine, and much thought and attention has been given to the admission of air currents thereto induced by movement of the vehicle. It is furthermore well known that air currents admitted at the front of the vehicle pass to the rear and build up swirling eddy currents which cause, at times, considerable discomfort to passengers in the rear portion of the vehicle.

While the various devices for ventilating motor vehicles have served the purpose of admitting air currents through the front, none, so far as I am aware, have provided an effective means for separating water or sleet from the air currents and they thus become ineffective in stormy weather. It is well known that many accidents are caused by dangerous concentration of gases in the interior of motor vehicles running closed tight during stormy weather, due to the fact that they can not be ventilated without extreme discomfort to the passengers. Also, such devices with which I am familiar for admitting air to the vehicle so direct the currents that they must strike directly the occupants of the vehicle, often causing discomfort.

It is accordingly a prime object of my invention to provide a ventilating system whereby a regulated air stream passes through the vehicle from front to rear without the necessity of directly striking the occupants of the vehicle, and thus to provide a maximum of comfort and safety for the occupants.

Briefly, my invention comprises the provision of an air admission chamber in front of the forward compartment of the vehicle, and which may be conveniently located above the cowl and beneath the windshield of the vehicle, and which extends across the vehicle a sufficient distance to provide the requisite ventilation under adverse weather conditions. The front of this air admission chamber is preferably screened to prevent the ingress of insects, and its rear portion is brought rearwardly of the windshield with its rear wall curved upwardly to direct the air currents upwardly back of the windshield so that unless otherwise deflected they tend to follow the inner side of the windshield and the under side of the top of the vehicle and thereby at a minimum strike the occupants in the front seat of the vehicle in the face.

Also located within the air admission chamber is a cowl ventilator which, when desired, may be utilized, as is well understood, to admit air currents downwardly around the feet of the front seat occupants. The air admission chamber is provided with gutters so located as to entrain entering water and drain it away so that it does not enter the vehicle body.

At the rear of the vehicle body and preferably in the upper portion thereof, and especially at a point where the air pressure, due to the forward movement of the vehicle, is less than that obtaining within the vehicle, I provide an adjustable outlet means which permits the air entering the forward part of the vehicle to pass directly out to the rear without creating uncomfortable eddy currents in the vehicle.

Apparatus embodying features of my invention is illustrated in the accompanying drawings forming a part of this application, in which Fig. 1 is an elevation with parts broken away showing a motor vehicle having my improved ventilating system applied thereto;

Fig. 2 is an enlarged sectional view through the air admission chamber, and taken along the line II—II of Fig. 4;

Fig. 3 is a detail sectional view taken along the line III—III of Fig. 2;

Fig. 4 is a plan view, partly in section, of the air admission chamber and front of the vehicle body;

Fig. 5 is an enlarged sectional view showing the air outlet means at the rear of the vehicle;

Fig. 6 is a rear view of the vehicle showing the rear air outlet in elevation;

Fig. 7 is a sectional view of the air admission chamber showing a modified form of valve means for admitting air into the interior of the vehicle body; and Fig. 8 is a fragmentary sectional view showing a modified form of rear outlet valve mechanism.

Referring to the drawings for a better understanding of my invention, I show a motor vehicle having a body 10, windshield 11, which is preferably fixed, and a cowl 12. Located beneath the windshield 11 and on the cowl 12 is the air admission chamber 13. The upper wall 14 of the air admission chamber extends forwardly generally parallel to the cowl 12, turning abruptly downwardly to provide a front 16 for engaging the air currents as the vehicle moves forwardly. The front 16 of the air admission chamber may be provided with a single opening or, for the purpose of ornamentation, a plurality of openings 17 for the admission of air to the chamber, and across each of the openings 17 is a screen 18 to prevent the access of flying insects.

The bottom wall 19 of the air admission chamber extends rearwardly of the windshield and is curved upwardly and is formed with a spirally rolled edge to form a gutter 21 to catch water entering with the air current, which gutter terminates in a drain conduit 20 leading downwardly therefrom to carry off the water. Also the upper wall 14 is brought rearwardly of the windshield and is provided with a spirally rolled edge 25 which joins the rolled edge of the lower wall 19 at the ends and thus connects with the drain 20.

Located within the air admission chamber 13 is a cowl ventilator 22 which may be opened if desired to direct part of the air currents downwardly around the feet of the occupants of the front section of the vehicle. Surrounding the opening 23, in which the cowl ventilator is situated, is a gutter 24 terminating in a drain 26 which serves to carry away water entering with the air around the cowl ventilator opening.

As will be seen from the drawings, the upwardly turned bottom wall 19 forms, with the top wall 14 of the air chamber, an upwardly directed passage leading into the interior of the vehicle body. The passage of air from the chamber to the interior of the vehicle body is controlled by a plurality of butterfly valve members 27 arranged to overlap and seat, as shown when in closed position. Each of the valve members is provided with a pinion 28 which meshes with a rack 29 on an operating rod 30 extending rearwardly through the instrument board 31 of the vehicle. The valves may thus be closed or opened to any desired angle of opening to deflect entering air currents in a direction to provide the maximum of comfort to the occupants of the vehicle. Preferably one set of valves is arranged for each side, as shown in Fig. 4, so as to provide independent adjustment of the admission of air on each side of the vehicle.

The arrangement of the outlet passage with the valve 27, either in the open or closed position, insures against admission through this device to the interior of the vehicle by pilferers when the vehicle is left unattended.

Located in the upper rear sloping roof portion of the vehicle body as shown in Fig. 1, and extending across beneath the rear window 35 is an outlet passage 32 in which is located an outlet valve 33 pivoted along its lower edge at 40, which may be opened and closed by means of a suitable handle 34 secured thereto, and adjusted to any desired position by means of its engagement with a notched spring quadrant 36. It will be understood, however, that the operating means herein shown is only illustrative and that many other means for adjusting the valve will suggest themselves to those skilled in the art.

The arrangement of the outlet passage, with its valve either in open or closed position, insures against admission through the device to the interior of the vehicle by pilferers when the vehicle is left unattended. Likewise, the rear window with the valve arrangement pivoted as shown forwardly of the lower edge of the window 35 effectively prevents rain and sleet from entering the interior of the vehicle when the valve is in open position.

In Fig. 7 I show a modified form of air admission mechanism which may be used with my invention. Instead of a plurality of valves, I may employ a single pivoted valve 37 of the butterfly type operated through a crank 38 and push rod 39, the latter extending outwardly through the instrument board 31.

In Fig. 8 I show a modified form of air outlet means. In accordance with this modification I provide a rear valve member 42 having the same contour as the rear of the body. The valve member is pivoted at its lower end, at 43, and is opened downwardly by means of a handle 44 being adjustable to any desired position by means of a spring segment 46. In order to prevent leakage around the valve 42 when closed, I provide it with a groove 47 in which a turned down flange 48 of the opening around the valve snugly fits.

From the foregoing description, the operation of my improved ventilating system will become apparent. Air currents induced by the forward movement of the vehicle enter the air admission chamber 13 through the screened opening 17. Water in the air admitted is caught in the gutters 24 and 21 and is carried away through the drains. The air admitted to the interior of the vehicle from the air admission chamber may be deflected upwardly along the windshield or in any desired direction by means of the upwardly curved wall 19 and the valves 27, and passes rearwardly and outwardly through ventilating devices in the rear. It will be seen that by adjustment of the valves any desired circulation of air through the vehicle may be maintained without the production of discomforting eddy currents and that the devices may be operated with safety during adverse weather conditions.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a ventilating system for motor vehicles, means defining an air admission chamber across the vehicle beneath the windshield and extending rearwardly into the vehicle body, valve means controlling the admission of air from the air admission chamber into the vehicle body, and water collecting troughs within said chamber which are adapted to trap and discharge below the windshield level any water entering the chamber with the inflowing air current.

2. In a ventilating system for motor vehicles, means defining an air admission chamber extending forwardly of the vehicle windshield and having a lower wall extending rearwardly of the windshield and curved upwardly to define with the forward wall thereof an upwardly directed passage opening into the vehicle body, deflecting valves in the passage, and means to adjust the deflecting valves to control the direction of the entering air currents.

3. In a ventilating system for motor vehicles, means defining an air admission chamber extending forwardly of the vehicle windshield and having a lower wall extending rearwardly of the windshield and curved upwardly to define with the forward wall thereof an upwardly directed passage opening into the vehicle body, valve means in the passage, and means to regulate the valve means so as to direct the air currents upwardly from the air admission chamber into the vehicle body, and a cowl ventilator within the air admission chamber for directing air currents downwardly into the vehicle body.

4. In a motor vehicle having a windshield, a cowl and a cowl ventilator opening into the vehicle through the cowl, a hood overhanging the cowl ventilator and having an opening at its rear into the vehicle above the cowl, and having screened air admission openings forward of the cowl ventilator.

5. In a motor vehicle having a windshield, a cowl and a cowl ventilator opening into the vehicle through the cowl, a hood overhanging the cowl ventilator and having an opening at its rear into the vehicle above the cowl, and having screened air admission openings forward of the cowl ventilator, and means to entrap and drain away water entering with the air.

6. In a motor vehicle having a rearwardly sloping roof with a window therein and a windshield, a cowl and a cowl ventilator opening into the vehicle through the cowl, a hood overhanging the cowl ventilator and having an opening at its rear into the vehicle above the cowl, and having screened air admission openings forward of the cowl ventilator means to entrap and drain away water entering with the air, and means beneath the window in the rearwardly sloping roof defining a rear ventilating outlet to exhaust the air responsive to the motion of the car, and a valve means pivoted horizontally along its lower edge for controlling said ventilating outlet.

7. In a motor vehicle having a rearwardly sloping roof with a window therein and a windshield, a cowl and a cowl ventilator opening into the vehicle through the cowl, a hood overhanging the cowl ventilator and having an opening at its rear into the vehicle above the cowl, and having screened air admission openings forward of the cowl ventilator, means to entrap and drain away water entering with the air, means defining a rear ventilating outlet disposed beneath and forward of the lower edge of the window in the rearwardly sloping roof to exhaust the air responsive to the motion of the car, and adjustable valve means pivoted along the lower side of the ventilating outlet.

8. In a motor vehicle having a windshield and a cowl, a ventilating means interposed transversely between the windshield and the cowl and comprising an air duct having a screened air inlet opening forwardly and an air outlet opening into the vehicle above the cowl rearwardly of the windshield, a cowl ventilator to control the downflow of air from the air duct, means within the air duct to trap and remove water entrained with the air currents in said duct, and valve means to direct upwardly the entering air currents.

9. In a ventilating system for a motor vehicle having a cowl and a windshield, means defining an air admission chamber extending across the cowl beneath the windshield, said air admission chamber having screened front openings for the admission of air, a bottom wall for the chamber extending rearwardly of the windshield and inclined upwardly to define an upwardly directed discharge opening, a spirally rolled edge provided around the discharge opening and disposed to catch and drain away rain entering with the air, and adjustable valve means in the discharge opening.

10. In a ventilating system for a motor vehicle having a cowl and a windshield, means defining an air admission chamber extending across the cowl beneath the windshield, said air admission chamber having screened front openings for the admission of air, a bottom wall for the chamber extending rearwardly of the windshield and inclined upwardly to define an upwardly directed discharge opening, a spirally rolled edge provided around the discharge opening disposed to catch and drain away rain entering with the air, adjustable valve means in the discharge opening, and a cowl ventilator disposed between the admission and discharge openings for discharging air currents downwardly into the vehicle.

11. In a motor vehicle having a windshield and a cowl, a ventilating means interposed between the windshield and the cowl and comprising an air duct having a forward air admission opening, a rear discharge opening disposed rearwardly of the windshield, and a bottom discharge opening, and valve means to control the discharging air currents downwardly through the bottom opening and upwardly through the discharge opening to the rear of the windshield.

12. A motor vehicle having a rearwardly and upwardly sloping front wall rising from its cowl, and a rearwardly and downwardly sloping back wall, an inclined windshield in said front wall, a back ventilator in said back wall and a screened front ventilator disposed transversely of the vehicle between its windshield and cowl and opening into the vehicle in position to discharge the ventilating air upwardly against said windshield, means to catch and discharge water tending to enter the vehicle along with the ventilating air current, and valve means to regulate the outflow of air through said back wall ventilator and guard against access of water at that point.

13. A motor vehicle having an upwardly and rearwardly sloping windshield, a transversely disposed screened front ventilator opening under the windshield and having regulating valve means adapted to control the volume of the entering air and its angle of incidence against the inner face of the windshield, and a rear ventilator disposed in a rearwardly and downwardly sloping wall of the vehicle and having means to regulate the outflow of air and to guard against the access of water.

EDWIN H. BUFORD.